(12) United States Patent
Aoki (10) Patent No.: US 9,272,582 B2
(45) Date of Patent: Mar. 1, 2016

(54) PNEUMATIC TIRE

(71) Applicant: Sumitomo Rubber Industries Ltd., Kobe-shi (JP)

(72) Inventor: Chieko Aoki, Kobe (JP)

(73) Assignee: SUMITOMO RUBBER INDUSTRIES LIMITED, Kobe-shi (JP)

( * ) Notice: Subject to any disclaimer, the term of this patent is extended or adjusted under 35 U.S.C. 154(b) by 313 days.

(21) Appl. No.: 13/747,639

(22) Filed: Jan. 23, 2013

(65) Prior Publication Data

US 2013/0186542 A1 Jul. 25, 2013

(30) Foreign Application Priority Data

Jan. 24, 2012 (JP) ................. 2012-012320

(51) Int. Cl.
*B60C 15/04* (2006.01)
(52) U.S. Cl.
CPC ........... *B60C 15/04* (2013.01); *B60C 2015/048* (2013.04); *Y10T 152/10819* (2015.01)
(58) Field of Classification Search
CPC ....................................................... B60C 15/04
USPC ................................................. 152/539, 540
See application file for complete search history.

(56) References Cited

U.S. PATENT DOCUMENTS

| 3,556,922 | A | * | 1/1971 | Green | 428/98 |
| 3,942,574 | A | * | 3/1976 | Bantz | 152/540 |
| 5,307,853 | A | * | 5/1994 | Okuda | 152/540 |
| 5,700,336 | A | * | 12/1997 | Gerresheim | 152/540 |
| 6,598,642 | B1 | * | 7/2003 | Hirai | 152/539 |
| 2004/0016496 | A1 | * | 1/2004 | Baldwin, Jr. | 152/540 |
| 2009/0194215 | A1 | * | 8/2009 | Daghini et al. | 152/540 |

FOREIGN PATENT DOCUMENTS

| JP | 07-096720 | | 4/1995 |
| JP | 07-156618 | * | 6/1995 |
| JP | 2002-002237 | * | 1/2002 |
| JP | 2005-335584 | | 12/2005 |

OTHER PUBLICATIONS

English machine translation of JP07-156618, dated Jun. 1995.*
English Abstract, KR2007-056596, dated Jun. 2007.*
The Pneumatic Tire. Aug. 2005. National Highway Traffic Safety Administration, pp. 80-88.*

* cited by examiner

*Primary Examiner* — Justin Fischer
*Assistant Examiner* — Robert Dye
(74) *Attorney, Agent, or Firm* — Oblon, McClelland, Maier & Neustadt, L.L.P.

(57) ABSTRACT

A pneumatic tire has bead cores provided in bead portions. The bead cores include a first bead wire, and a second bead wire having an elongation $\alpha$, where $\alpha(\%)=\Delta L/L \times 100$, L is a length of each of the bead wires under no load, and $\Delta L$ is an elongation amount obtained when a unit load is applied. The elongation $\alpha$ of the second bead wire is greater than an elongation of the first bead wire. The number of the second bead wire provided in an innermost side portion in a tire radial direction is at least one.

20 Claims, 6 Drawing Sheets

PNEUMATIC TIRE

CROSS-REFERENCE TO RELATED APPLICATIONS

The present application is based upon and claims the benefit of priority from Japanese Application No. 2012-012320, filed Jan. 24, 2012, the entire contents of which are incorporated herein by reference.

BACKGROUND OF THE INVENTION

1. Field of the Invention

The present invention relates to pneumatic tires that enable reduction of fitting pressure, and enhancement of workability of mounting the tires to rims and durability of bead portions while maintaining a tightening force of bead cores.

2. Description of the Background Art

Bead cores for use in pneumatic tires for passenger cars are each formed by one bead wire or plural bead wires being continuously wound in a tire circumferential direction. Further, various types of bead cores are suggested in order to enhance various performance characteristics of tires. For example, a bead core in which an organic fiber is used in a part of a bead wire in order to reduce a weight of a tire (see Japanese Laid-Open Patent Publication No. 7-96720), and a bead core having formed therein a gap for absorbing vibration in order to absorb road noise (see Japanese Laid-Open Patent Publication No. 2005-335584), are suggested.

On the other hand, in recent years, flattening of pneumatic tires for use in passenger cars has been significantly restrained, and run flat tires that enable running in a punctured state have increased. Therefore, it is particularly required to enhance a tightening force of bead cores and restrain rim misalignment and rim detachment. In response to these requests, in general, a width of a bead core is increased, or the number of bead wires disposed in a bead core is increased. Thus, the tightening force of the bead core is enhanced, to restrain rim misalignment and rim detachment.

However, in a case where the tightening force of the bead core is increased, when the tire is mounted to a rim, it is difficult to move a bead portion over a hump provided in the rim, and an air pressure (hereinafter, the air pressure is referred to as "fitting pressure") with which the tire is inflated when the bead portion is moved over the hump, is increased. Due to the fitting pressure having been thus increased, an impact becomes excessively increased when the bead portion of the tire having been moved over the hump comes into close contact with a rim flange surface. Therefore, the bead portion may be damaged, and durability of the bead portion may be deteriorated. The entire contents of Japanese Laid-Open Patent Publication Nos. 7-96720 and 2005-335584 are incorporated herein by reference.

SUMMARY OF THE INVENTION

A first aspect of the present invention is directed to a pneumatic tire having bead cores provided in bead portions. In the pneumatic tire, on a tire meridian cross-section including a tire rotation axis, each of the bead cores is formed of bead wires, and the bead wires include a first bead wire, and a second bead wire having an elongation α, represented by equation (1), which is greater than an elongation of the first bead wire, and the number of the second bead wires to be provided in an innermost side portion of the bead cores in a tire radial direction, is at least one.

the elongation $\alpha(\%) = \Delta L / L \times 100$     (1)

L: a length of each bead wire under no load

ΔL: an elongation amount obtained when a unit load is applied

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
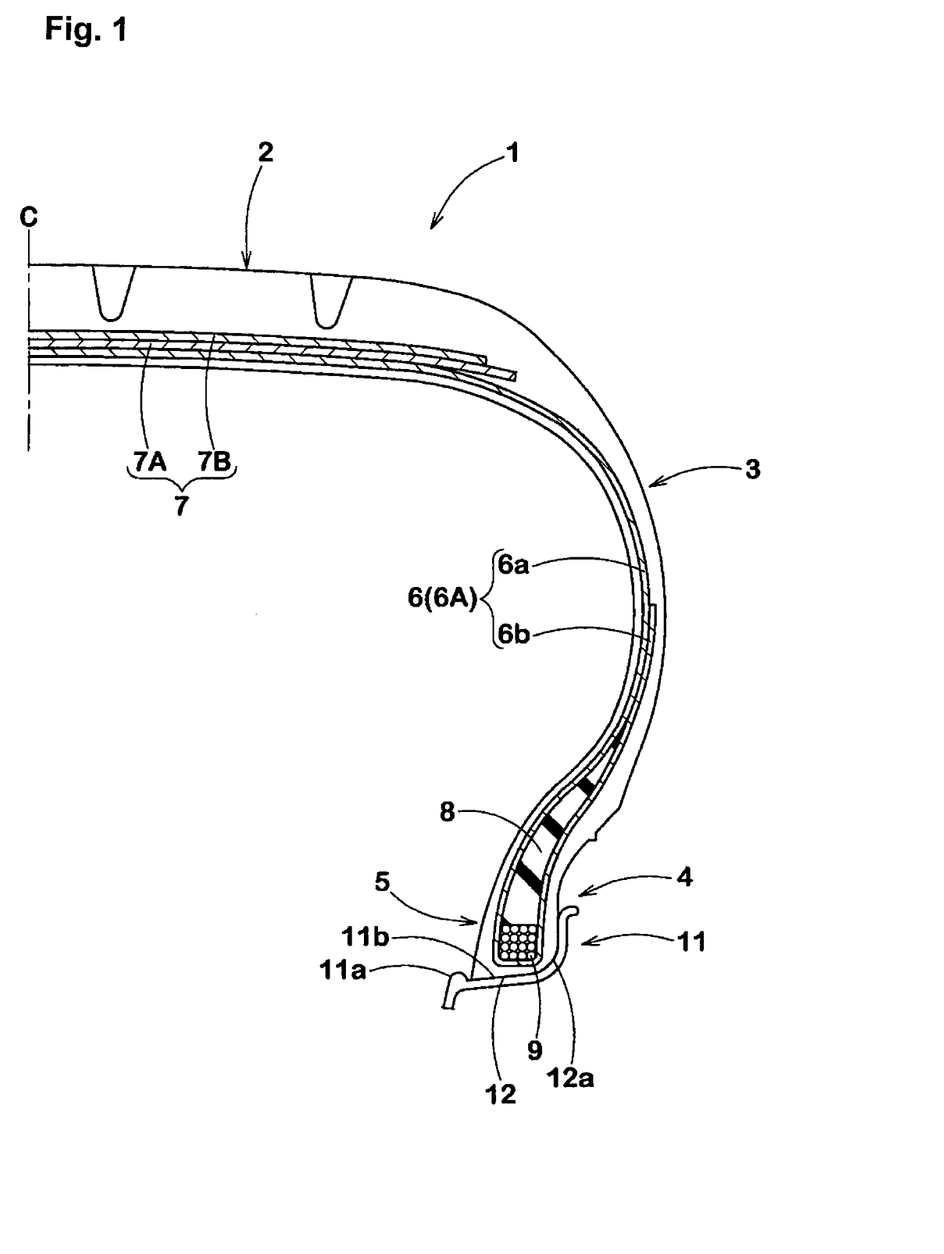
FIG. 1 is a cross-sectional view of a pneumatic tire according to one embodiment of the present invention.

FIG. 1 is a tire meridian cross-sectional view of a pneumatic tire 1 of the present embodiment, in a normal state, including a tire axis. The normal state represents a state where a tire is mounted to a normal rim, and inflated to a normal internal pressure, and no load is applied. Hereinafter, unless otherwise specified, dimensions of components of the tire represent values measured in the normal state.

The "normal rim" described above represents a rim that is defined, in a standard system including a standard with which a tire complies, by the standard for each tire, and is, for example, the "standard rim" in the JATMA standard, the "Design Rim" in the TRA standard, and the "Measuring Rim" in the ETRTO standard. Further, the "normal internal pressure" represents an air pressure that is defined, in a standard system including a standard with which a tire complies, by the standard for each tire, and is the "maximum air pressure" in the JATMA standard, the maximum value recited in the table "TIRE LOAD LIMITS AT VARIOUS COLD INFLATION PRESSURES" in the TRA standard, and the "INFLATION PRESSURE" in the ETRTO standard. When the tire is for passenger cars, the normal internal pressure is 180 kPa.

As shown in FIG. 1, the pneumatic tire 1 of the present embodiment includes: a carcass 6 extending from a tread portion 2 through sidewall portions 3 to bead cores 5 of bead portions 4; a belt layer 7 disposed inside the tread portion 2 outward of the carcass 6 in the tire radial direction; and bead apex rubbers 8 that extend from the bead cores 5 outward in the tire radial direction so as to be tapered. In the present embodiment, a radial tire for passenger cars is shown.

Further, the carcass 6 is formed as a single carcass ply (6A), and includes a toroidal body portion (6a) that extends from the tread portion 2 through the sidewall portions 3 to the bead cores 5 of the bead portions 4, and turned-up portions (6b) that are turned up around the bead cores 5 from the inner side to the outer side in the tire axial direction. Further, the carcass ply (6A) is a cord ply in which carcass cords are covered with a topping rubber, and each carcass cord is disposed diagonally relative to the tire equator (C) by, for example, 75° to 90° in the present embodiment. An organic fiber cord such as a polyester cord, a nylon cord, a rayon cord, and an aramid cord is advantageously used for the carcass cord, and a steel cord may be used as appropriate.

In the belt layer 7, two belt plies (7A, 7B) having belt cords aligned so as to be diagonal relative to the tire equator (C) by, for example, 15° to 35°, are layered in the tire radial direction such that the belt cords cross each other. For the belt cords, for example, steel cords, aramid cords, rayon cords, or the like are advantageously used.

The bead apex rubbers 8 are formed of a hard rubber, and are disposed between the body portion (6a) and each turned-up portion (6b), and extend from each bead core 5 outward in the tire radial direction so as to be tapered. Thus, the bead portions 4 and the sidewall portions 3 are reinforced.

Figure 2:
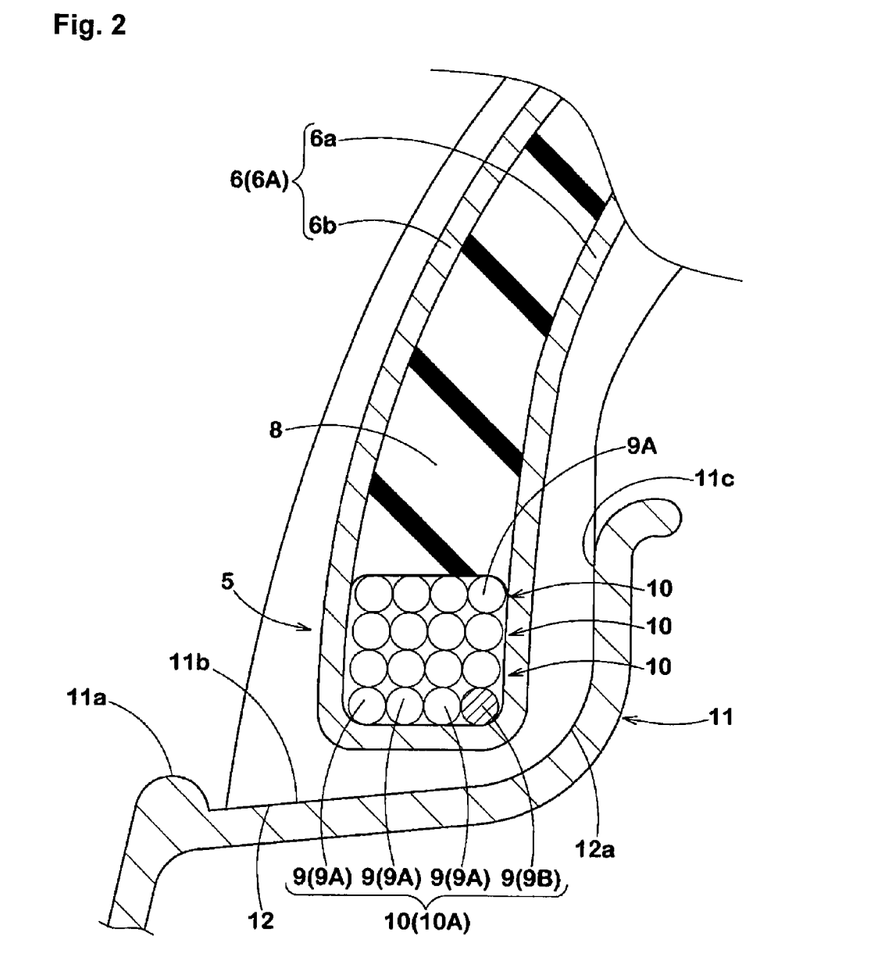
FIG. 2 is a partially enlarged cross-sectional view of a bead portion shown in FIG. 1.

FIG. 2 is a partially enlarged cross-sectional view of the bead portion 4. Each bead core 5 is formed by bead wires 9 being wound in the tire circumferential direction. In the present embodiment, the bead core 5 has a roughly rectangular cross-section since four bead wire layers 10 each having the four bead wires 9 aligned in the tire axial direction are layered in the tire radial direction. The number of the bead wires 9 and the cross-sectional shape of the bead core 5 are not limited to those in the present embodiment.

The bead wires 9 include first bead wires (9A), and second bead wires (9B) each having an elongation α, represented by the following equation (1), which is greater than that of each first bead wire (9A). In order to easily distinguish between the first bead wires and the second bead wires, the second bead wires (9B) are indicated by hatched lines in the drawings.

$$\text{Elongation } \alpha(\%) = \Delta L / L \times 100 \tag{1}$$

L: Length of bead wire in the case of no load being applied
ΔL: Elongation amount obtained when a unit load is applied When the bead wire 9 is a steel wire, the elongation α is measured in compliance with Force at break and Elongation at break (6.4) of "Testing methods for steel tire cords" of JIS G3510, and is calculated by measuring an elongation amount in a state where a unit load is applied at a tensile speed of 125 mm/min. with the bead wire length (grip clearance) of 250 mm. Further, when the bead wire 9 is an organic fiber cord, the elongation α is measured as an elongation rate, under a constant load, which is measured according to "a test carried out at the time of standard condition" of "Elongation rate when a constant load is applied (8.7)" in "Test methods for chemical fiber tire cords" of JIS L1017.

The first bead wires (9A) form a main portion of the bead core 5 so as to maintain a tightening force of the bead core 5, whereas at least one bead wire is provided as the second bead wire (9B) on the innermost side portion in the tire radial direction in order to reduce a fitting pressure. Thus, while the tightening force of the entirety of the bead core 5 is maintained by the first bead wires (9A), the second bead wire (9B) is provided in a portion closest to a bead base surface 12, and therefore, when the tire is mounted to a rim, the second bead wire (9B) is locally elongated to enable the bead base surface 12 to be easily moved over a hump (11a). Therefore, a fitting pressure can be effectively reduced, and a workability of mounting the tire to the rim and durability of the bead portion 4 are enhanced. In the description herein, the "tightening force" represents a pressure applied from the bead base surface 12 to a rim base surface (11b) in the normal state.

In the present embodiment, the number of the second bead wires (9B) provided in an innermost bead wire layer (10A) that is the bead wire layer 10 provided on the innermost side in the tire radial direction, is at least one. Thus, when the bead base surface 12 is moved over the hump (11a), the second bead wire (9B) provided in the innermost bead wire layer (10A) is locally elongated, thereby reducing a fitting pressure.

Figure 3:
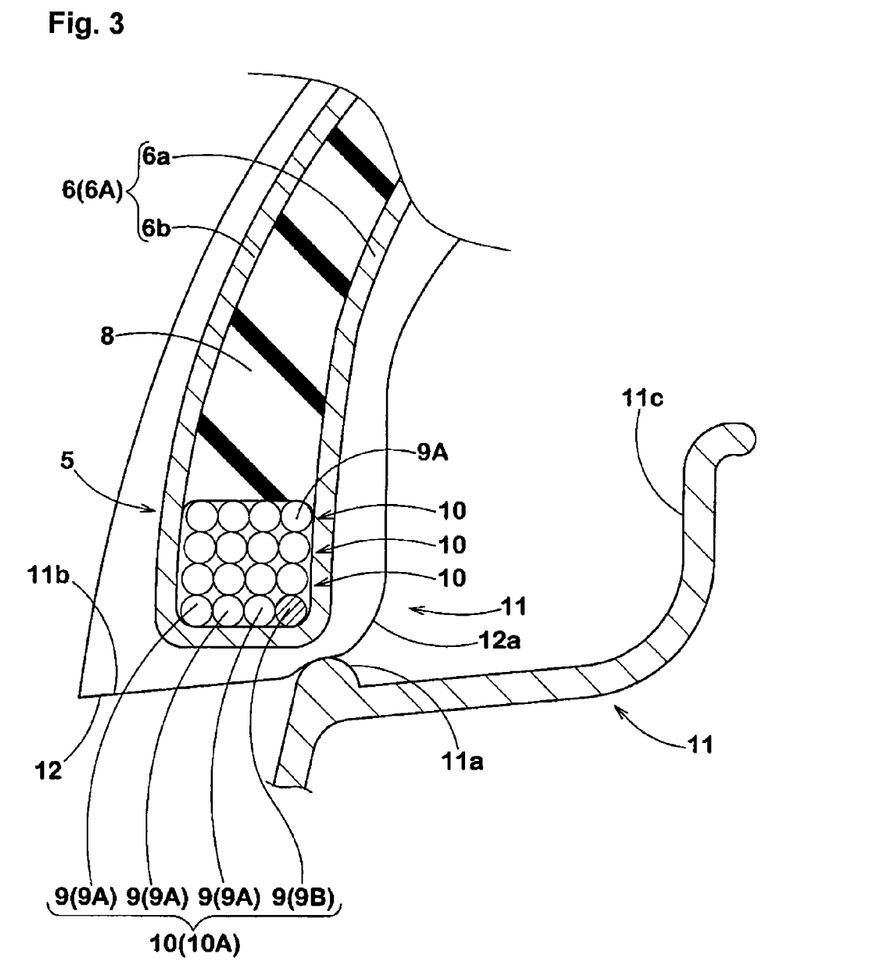
FIG. 3 is a partial cross-sectional view of the bead portion that is being moved over a hump.

Further, the second bead wire (9B) is advantageously positioned in an outermost side portion of the innermost bead wire layer (10A) in the tire axial direction. In this case, the second bead wire (9B) having an increased elongation is provided at a corner, on a heel side, of the bead core 5 having a roughly rectangular cross-section. Therefore, as shown in FIG. 3, in a case where the tire is mounted to the rim, when the tire is filled with an air pressure in a state where a bead heel (12a) abuts against the hump (11a), the second bead wire provided at the corner of the bead core 5 which is firstly pressed by the hump (11a), is locally elongated greatly, and the bead heel (12a) and the bead base surface 12 are allowed to be easily moved over the hump (11a), thereby effectively reducing the fitting pressure.

Figure 4:
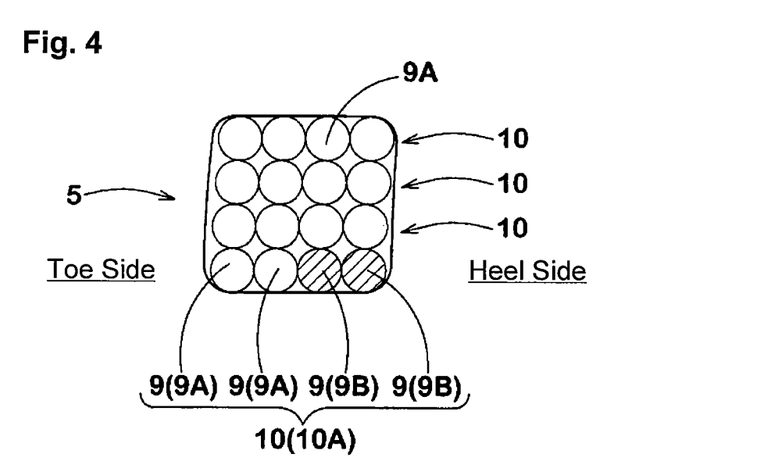
FIG. 4 is a cross-sectional view of a bead core according to one embodiment of the present invention.
Figure 5:
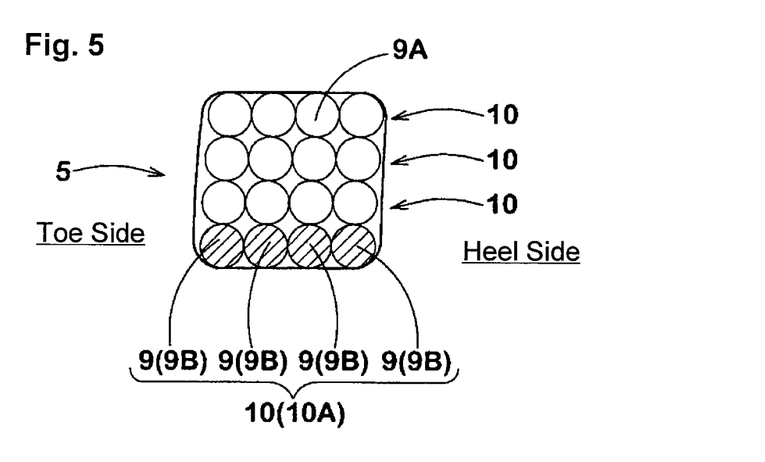
FIG. 5 is a cross-sectional view of a bead core according to one embodiment of the present invention.
Figure 6:
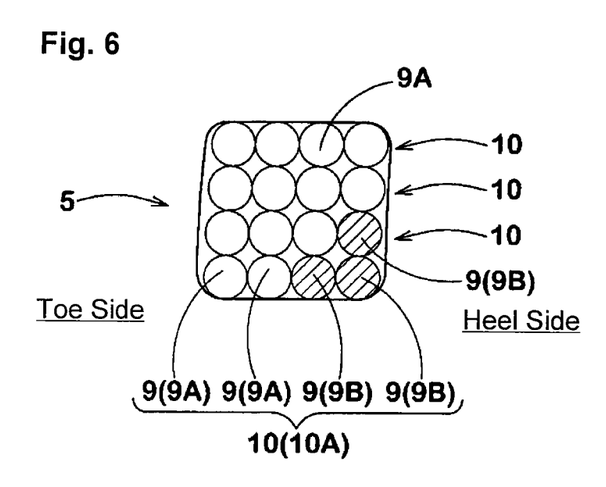
FIG. 6 is a cross-sectional view of a bead core according to one embodiment of the present invention.

FIG. 4 to FIG. 6 each show another embodiment of the bead core 5.

When a fitting pressure is high, a plurality (two in the present embodiment) of the bead wires 9 may be formed, as the second bead wires (9B), on the heel side of the innermost bead wire layer (10A) as shown in FIG. 4. Further, as shown in FIG. 5, all the bead wires in the innermost bead wire layer (10A) may be formed as the second bead wires (9B). The number of the second bead wires (9B) is changed as appropriate, so that a fitting pressure is effectively reduced with the tightening force of the bead core 5 being maintained.

Further, in a case where a resistance is particularly high when a corner portion, on the heel side, of the bead core 5 is moved over the hump (11a), both the plurality of the bead wires 9, on the heel side, of the innermost bead wire layer (10A), and the bead wire 9 provided on the outermost side, in the tire axial direction, of the bead wire layer 10 provided outward of the innermost bead wire layer (10A) in the tire radial direction, are advantageously formed as the second bead wires (9B), as shown in FIG. 6. Thus, since the three second bead wires (9B) are elongated when the bead heel (12a) is moved over the hump (11a), reduction of the fitting pressure can be enhanced.

The number of the second bead wires (9B) is not limited to any specific number. However, when the number of the second bead wires (9B) is excessively reduced, an effect of reducing the fitting pressure is less likely to be sufficiently exhibited. On the other hand, when the number thereof is excessively increased, the tightening force of the bead core 5 may be reduced. In this viewpoint, the number of the second bead wires (9B) is preferably greater than or equal to 2% of the number of all the bead wires 9, is more preferably greater than or equal to 4% thereof, and is still more preferably greater than or equal to 6% thereof. Further, the number of the second bead wires (9B) is preferably not greater than 45% of the number of all the bead wires 9, is more preferably not greater than 35% thereof, and is still more preferably not greater than 25% thereof.

The elongation α of the second bead wire (9B) is set so as to be greater than the elongation of the first bead wire (9A). However, if the elongation α is excessively increased, the second bead wire (9B) is excessively elongated in a normal traveling, and loads on the other bead wires 9 may be increased. On the other hand, if the elongation α is excessively reduced, an effect of reducing the fitting pressure is less likely to be sufficiently exhibited. In this viewpoint, the second bead wire (9B) is formed such that a difference β in elongation represented by the following equation (2) is less than or equal to 20%, and is more preferably less than or equal to 10%, and is not less than 5%, and is more preferably not less than 8%.

$$\text{Difference } \beta(\%) \text{ in elongation} = (\alpha2 - \alpha1)/\alpha2 \times 100 \quad (2)$$

α1: Elongation of first bead wire
α2: Elongation of second bead wire

In a normal travelling, if even one of the bead wires 9 of the bead core 5 is broken, this may cause the other bead wires 9 to also break in conjunction therewith. Therefore, a breaking strength of the second bead wire (9B) is preferably higher than or equal to 90% of a breaking strength of the first bead wire (9A), and is more preferably higher than or equal to 95% thereof. Thus, a difference in breaking strength between the first bead wire (9A) and the second bead wire (9B) is reduced, to restrain the breakage of the bead wires 9 from being caused due to breakage of any one of the bead wires. Further, a breaking strength of the second bead wire (9B) may be higher than a breaking strength of the first bead wire (9A). The breaking strength is measured in compliance with a method for measuring the elongation α, and a force at break applied when a test piece is broken, is measured as the breaking strength.

FIGS. 7A to 7D show embodiments of the bead wire 9.

Figure 7A:
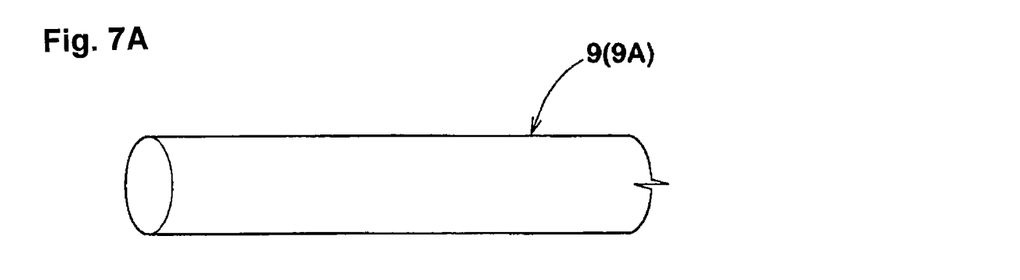
FIG. 7A is an enlarged view of a bead wire formed as a signal steel wire.
Figure 7B:
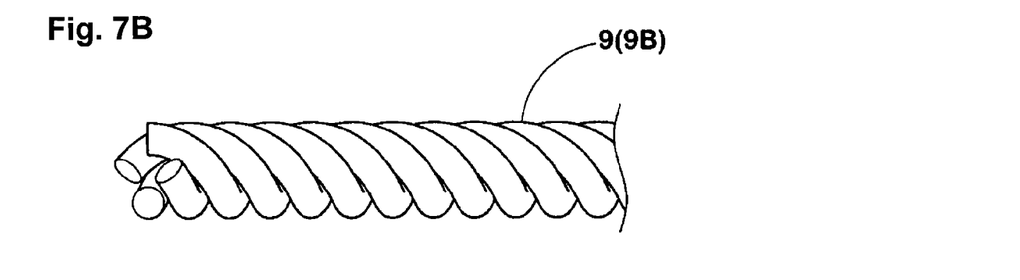
FIG. 7B is an enlarged view of a bead wire having an exemplary twisted structure.
Figure 7C:
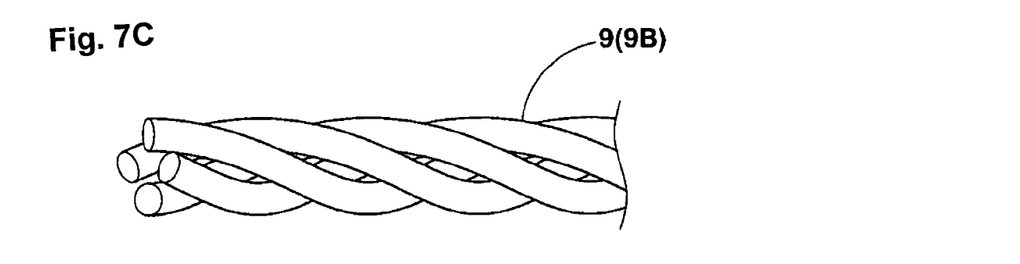
FIG. 7C is an enlarged view of a bead wire which is obtained by the number of twists being reduced as compared to the bead wire shown in FIG. 7B.

The first bead wires (9A) are advantageously formed as, for example, steel wires. In the present embodiment, as shown in FIG. 7A, the first bead wires (9A) are each formed as a single steel wire having a low elongation. Thus, a tightening force is sufficiently exhibited, and rim misalignment and rim detachment are prevented. Further, since the elongation α may be less in the first bead wire (9A) than in the second bead wire (9B), a steel cord obtained by steel filaments (9a) being twisted together as shown in FIGS. 7B and 7C, can be used.

The second bead wire (9B) is formed so as to have the elongation α greater than the first bead wire (9A). In the present embodiment, as shown in FIG. 7B or FIG. 7C, a steel wire that is formed of a cord obtained by multiple steel filaments (9a) being twisted together, is used. Thus, the second bead wire (9B) is allowed to have the elongation α greater than the first bead wire (9A).

Figure 7D:
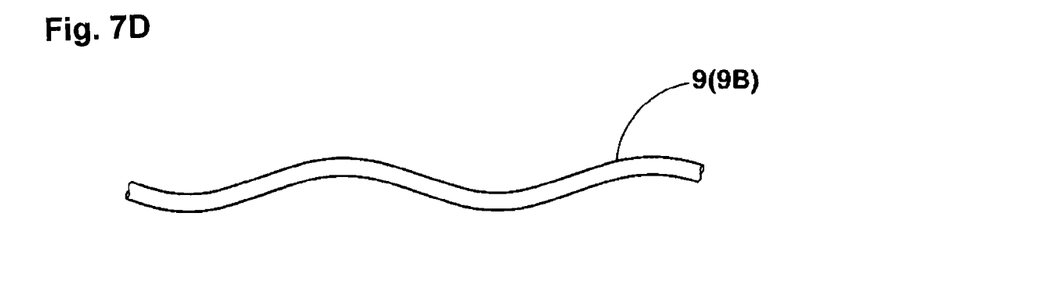
FIG. 7D is an enlarged view of a bead wire obtained by a single wire being waved.

A single steel wire may be used for the second bead wire. In this case, as shown in, for example, FIG. 7D, a cross-sectional area of the second bead wire (9B) is set so as to be smaller than a cross-sectional area of the first bead wire (9A) such that the second bead wire (9B) has the elongation α greater than the first bead wire (9A). Further, as shown in FIG. 7D, the second bead wire (9B) may be processed so as to be waved.

Further, it is favorable that the second bead wire (9B) and the first bead wires (9A) are integrally connected and continuously extend in the tire circumferential direction. Thus, when tires are produced, for example, one bead wire 9 may be continuously wound, thereby enabling enhancement of productivity. The first bead wires (9A) and the second bead wire (9B) are connected by, for example, caulking or welding.

Further, an organic fiber cord may be used for the second bead wire (9B). In this case, the difference β in elongation is increased, so that the fitting pressure is effectively reduced, and further, a weight of the bead core 5 is reduced to enhance fuel consumption performance. As the organic fiber cord for the second bead wire (9B), for example, an organic fiber cord, such as an aramid cord, having a high tensile strength is advantageously used.

Cords obtained by the multiple filaments (9a) being twisted together can be used for both the first bead wires (9A) and the second bead wire (9B). In this case, a twisted structure of the second bead wire (9B) is made different from a twisted structure of the first bead wire (9A). For example, as shown in FIG. 7B and FIG. 7C, the number of twists per unit length is set so as to be different therebetween such that the second bead wire (9B) has the elongation α greater than the first bead wire (9A).

An embodiment of the present invention is implemented in the bead cores 5 on both sides in the tire axial direction. However, An embodiment of the present invention may be implemented in the bead core 5 on either one of the sides as appropriate. For example, in a case where shapes of the hump (11a) and the rim base surface (11b) are different between on one side and on the other side in the tire axial direction, and the shapes of the hump (11a) and the rim base surface (11b) on one side are more difficult to fit into the tire than the shapes thereof on the other side, the bead portion 4 including the bead core 5 of the present invention is provided on the one side. Thus, resistance to rim misalignment is less likely to be reduced as compared to a case where the bead cores 5 of the present invention are provided on both sides.

Although the embodiments of the present invention have been described in detail above, the present invention is not limited to the above embodiments shown in the drawings, and various modifications can be made to implement the present invention.

Examples

Pneumatic tires having the fundamental structure shown in FIG. 1 and having a size of 175/60R15 were produced based on the specifications indicated in Table 1. A rim misalignment and a fitting pressure were tested for each test tire. Further, the same test was performed, as Comparative Example, on a conventional tire in which the second bead wire was not provided. The test methods were as follows.

Rim Misalignment

Each test tire was mounted to a 15×6 JJ normal rim, and was inflated to an internal pressure of 250 kPa, and was then left indoors for 72 hours as it was. The rim having the tire mounted therein was mounted to a vehicle, and the vehicle which was running at a speed of 50 km/h was suddenly stopped once. Thereafter, a misalignment between the tire and the rim was measured. The results are indicated as indexes on the assumption that a value of an index of Comparative Example is 100. The less the value of the index is, the less the rim misalignment is.

Fitting Pressure

A fitting pressure applied when each test tire was mounted to the normal rim described above, was measured. The results are indicated as indexes on the assumption that a value of an index of Comparative Example is 100. The less the value of the index is, the less the fitting pressure is.

The test results are indicated in Table 1.

TABLE 1

| | Comparative Example | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| The number of first bead wires (pieces) | 16 | 15 | 14 | 12 | 15 | 14 | 12 | 15 | 14 | 12 | 15 | 15 |
| Elongation α1 (%) of first bead wire (*) | 1.1 | 1.10 | 1.10 | 1.10 | 1.10 | 1.10 | 1.10 | 1.10 | 1.10 | 1.10 | 1.10 | 1.10 |
| Breaking strength (N/mm²) of first bead wire | 2100 | 2100 | 2100 | 2100 | 2100 | 2100 | 2100 | 2100 | 2100 | 2100 | 2100 | 2100 |
| The number of second bead wires (pieces) | 0 | 1 | 2 | 4 | 1 | 2 | 4 | 1 | 2 | 4 | 1 | 1 |
| Elongation α2 (%) of second bead wire (*) | — | 1.30 | 1.30 | 1.30 | 1.25 | 1.25 | 1.25 | 1.5 | 1.5 | 1.5 | 1.38 | 1.30 |
| Breaking strength (N/mm²) of second bead wire | — | 1985 | 1985 | 1985 | 2060 | 2060 | 2060 | 1890 | 1890 | 1890 | 1980 | 1900 |
| Figure showing positioning of second bead wire | — | FIG. 2 | FIG. 4 | FIG. 5 | FIG. 2 | FIG. 4 | FIG. 5 | FIG. 2 | FIG. 4 | FIG. 5 | FIG. 2 | FIG. 2 |
| Material of second bead wire | — | Steel | steel | steel | organic fiber | organic fiber | organic fiber | steel | steel | steel | steel | steel |
| Twisted structure of second bead wire | — | The number of twisted filaments is four | The number of twisted filaments is four | The number of twisted filaments is four | The number of twisted filaments is four | The number of twisted filaments is four | The number of twisted filaments is four | waved | waved | waved | Not twisted and not waved | Not twisted and not waved |
| Difference β (%) in elongation | — | 15 | 15 | 15 | 12 | 12 | 12 | 27 | 27 | 27 | 20 | 15 |
| Rim misalignment (index) | 100 | 63 | 67 | 100 | 63 | 67 | 100 | 100 | 100 | 100 | 100 | 100 |
| Fitting pressure (index) | 100 | 80 | 70 | 60 | 90 | 80 | 60 | 70 | 60 | 40 | 70 | 90 |

According to the test results, it can be confirmed that the rim misalignment and the fitting pressure are reduced in each of Examples 1 to 9 as compared to Comparative Example.

A pneumatic tire according to an embodiment of the present invention has a fundamental structure in which bead wires provided in bead cores include first bead wires, and second bead wires each having an elongation greater than each first bead wire, and the second bead wires having the greater elongation are provided in the innermost portion in the tire radial direction, and enables reduction of fitting pressure, and enhancement of workability of mounting the tire to a rim and durability of bead portions while maintaining a tightening force of the bead cores.

A first aspect of the present invention is directed to a pneumatic tire having bead cores provided in bead portions. In the pneumatic tire, on a tire meridian cross-section including a tire rotation axis, each of the bead cores is formed of bead wires, and the bead wires include a first bead wire, and a second bead wire having an elongation α, represented by equation (1), which is greater than an elongation of the first bead wire, and the number of the second bead wires to be provided in an innermost side portion of the bead cores in a tire radial direction, is at least one.

$$\text{the elongation } \alpha(\%) = \Delta L / L \times 100 \quad (1)$$

L: a length of each bead wire under no load

ΔL: an elongation amount obtained when a unit load is applied

Further, a second aspect of the present invention is the pneumatic tire according to the first aspect in which each bead core is formed such that bead wire layers each having bead wires that are aligned in a tire axial direction, are layered in the tire radial direction, and the number of the second bead wires to be provided in an innermost bead wire layer that is positioned on an innermost side in the tire radial direction among the bead wire layers, is at least one.

Further, a third aspect of the present invention is the pneumatic tire according to the second aspect in which the second bead wire is provided in an outermost side portion of the innermost bead wire layer in the tire axial direction.

Further, a fourth aspect of the present invention is the pneumatic tire according to the second aspect in which all of the bead wires in the innermost bead wire layer are each the second bead wire.

Further, a fifth aspect of the present invention is the pneumatic tire according to the first aspect in which the second bead wire is formed such that a difference β, in elongation, represented by equation (2) is less than or equal to 20%.

$$\text{the difference } \beta(\%) \text{ in elongation} = (\alpha 2 - \alpha 1) / \alpha 2 \times 100 \quad (2)$$

α1: an elongation of the first bead wire
α2: an elongation of the second bead wire Further, a sixth aspect of the present invention is the pneumatic tire according to the first aspect in which a breaking strength of the second bead wire is higher than or equal to 90% of a breaking strength of the first bead wire.

Further, a seventh aspect of the present invention is the pneumatic tire according to the first aspect in which the first bead wire is a steel wire, and the second bead wire is an organic fiber cord.

Further, an eighth aspect of the present invention is the pneumatic tire according to the first aspect in which each of the bead cores is formed by the bead wires being wound in a tire circumferential direction, and the second bead wire and the first bead wire are integrally connected and continuously extend in the tire circumferential direction.

Further, a ninth aspect of the present invention is the pneumatic tire according to the first aspect in which each of the first and the second bead wires is formed of a cord obtained by filaments being twisted together, and a twisted structure of the second bead wire is different from a twisted structure of the first bead wire.

In a pneumatic tire according to an embodiment of the present invention, the bead cores include the first bead wires, and the second bead wires each having an elongation greater than each first bead wire. The number of the second bead wires to be provided in the innermost side portion in the tire radial direction, is at least one. In the pneumatic tire thus structured, while a tightening force of the bead cores is maintained by means of the first bead wires, the second bead wires provided in the innermost side portion of the bead core in the tire radial direction are locally elongated greatly when the bead portion is moved over a hump, thereby enabling reduction of a fitting pressure, and enhancing workability of mounting the tire to a rim and durability of the bead portion.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
a plurality of bead portions having a plurality of bead cores, each of the bead cores comprising a plurality of bead wires,
wherein the plurality of bead wires is one of a plurality of steel wires and a plurality of organic fiber cords and includes a plurality of first bead wires and at least one second bead wire such that the at least one second bead wire is positioned in an innermost side portion of each of the bead cores in a tire radial direction, the second bead wire exhibits an elongation which is greater than an elongation of each of the first bead wires when the elongation of each of the bead wires is calculated by an equation, $\alpha = \Delta L/L \times 100$, where $\alpha$ represents the elongation, L represents a length of each of the bead wires under no load, and $\Delta L$ represents an elongation amount of each of the bead wires obtained when a same unit load is applied to each of the bead wires, and the second bead wire satisfies a difference in elongation which is less than or equal to 20%, when the difference is calculated by an equation, $\beta = (\alpha 2 - \alpha 1)/\alpha 2 \times 100$, where $\beta$ represents the difference in elongation, $\alpha 1$ represents the elongation of each of the first bead wires, and $\alpha 2$ represents the elongation of the second bead wire.

2. The pneumatic tire according to claim 1, wherein the plurality of bead wires in each of the bead cores is positioned such that the plurality of bead wires is forming a plurality of bead wire layers layered in the tire radial direction and each having bead wires aligned in a tire axial direction, and the at least one second bead wire is positioned in an innermost bead wire layer of the bead wire layers in the tire radial direction.

3. The pneumatic tire according to claim 2, wherein the second bead wire is positioned in an outermost side portion of the innermost bead wire layer in the tire axial direction.

4. The pneumatic tire according to claim 2, wherein the at least one second bead wire comprises a plurality of second bead wires, and each of the bead wires in the innermost bead wire layer is a second bead wire.

5. The pneumatic tire according to claim 1, wherein the at least one second bead wire is not greater than 45% of a number of the bead wires.

6. The pneumatic tire according to claim 1, wherein the second bead wire has a breaking strength which is higher than or equal to 90% of a breaking strength of each of the first bead wires.

7. The pneumatic tire according to claim 1, wherein the plurality of bead wires is a plurality of steel wires, respectively, and each of the first bead wires has a cross-sectional area which is greater than a cross-sectional area of the second bead wire.

8. The pneumatic tire according to claim 1, wherein the plurality of bead wires in each of the bead cores is wound in a tire circumferential direction, and the second bead wire and the first bead wires are integrally connected such that the plurality of bead wires continuously extends in the tire circumferential direction.

9. The pneumatic tire according to claim 1, wherein each of the first and the second bead wires is a cord comprising a plurality of filaments being twisted together, and the cord of the second bead wire has a twisted structure which is different from a twisted structure of the cord of the first bead wires.

10. The pneumatic tire according to claim 1, wherein the plurality of bead wires is a plurality of steel wires, respectively.

11. The pneumatic tire according to claim 10, wherein the plurality of bead wires in each of the bead cores is positioned such that the plurality of bead wires is forming a plurality of bead wire layers layered in the tire radial direction and each having bead wires aligned in a tire axial direction, and the at least one second bead wire is positioned in an innermost bead wire layer of the bead wire layers in the tire radial direction.

12. The pneumatic tire according to claim 11, wherein the second bead wire is positioned in an outermost side portion of the innermost bead wire layer in the tire axial direction.

13. The pneumatic tire according to claim 11, wherein the at least one second bead wire comprises a plurality of second bead wires, and each of the bead wires in the innermost bead wire layer is a second bead wire.

14. The pneumatic tire according to claim 10, wherein the at least one second bead wire is not greater than 45% of a number of the bead wires.

15. The pneumatic tire according to claim 10, wherein the second bead wire has a breaking strength which is higher than or equal to 90% of a breaking strength of each of the first bead wires.

16. The pneumatic tire according to claim 10, wherein the plurality of bead wires in each of the bead cores is wound in a tire circumferential direction, and the second bead wire and the first bead wires are integrally connected such that the plurality of bead wires continuously extends in the tire circumferential direction.

17. The pneumatic tire according to claim 10, wherein each of the first and the second bead wires is a cord comprising a plurality of filaments being twisted together, and the cord of the second bead wire has a twisted structure which is different from a twisted structure of the cord of the first bead wires.

18. The pneumatic tire according to claim 1, wherein the plurality of bead wires is a plurality of organic fiber cords, respectively.

19. The pneumatic tire according to claim 18, wherein the plurality of bead wires in each of the bead cores is positioned such that the plurality of bead wires is forming a plurality of bead wire layers layered in the tire radial direction and each having bead wires aligned in a tire axial direction, and the at least one second bead wire is positioned in an innermost bead wire layer of the bead wire layers in the tire radial direction.

20. The pneumatic tire according to claim 19, wherein the second bead wire is positioned in an outermost side portion of the innermost bead wire layer in the tire axial direction.

* * * * *